United States Patent
Endo et al.

(10) Patent No.: US 7,552,002 B2
(45) Date of Patent: Jun. 23, 2009

(54) NUMERICAL CONTROLLER

(75) Inventors: Takahiko Endo, Kokubunji (JP);
Yasushi Takeuchi, Hino (JP)

(73) Assignee: Fanuc Ltd, Yamanashi (JP)

( * ) Notice: Subject to any disclaimer, the term of this patent is extended or adjusted under 35 U.S.C. 154(b) by 484 days.

(21) Appl. No.: 11/410,145

(22) Filed: Apr. 25, 2006

(65) Prior Publication Data
US 2006/0241839 A1  Oct. 26, 2006

(30) Foreign Application Priority Data
Apr. 25, 2005 (JP) ................ 2005-126924

(51) Int. Cl.
*G06F 19/00* (2006.01)
(52) U.S. Cl. ...................................... 701/50
(58) Field of Classification Search .......... 701/50; 700/179–181, 169
See application file for complete search history.

(56) References Cited

U.S. PATENT DOCUMENTS

| | | | |
|---|---|---|---|
| 6,885,909 B2 | 4/2005 | Isohata | |
| 7,239,936 B2 * | 7/2007 | Suzuki et al. | 700/159 |
| 2003/0191553 A1 | 10/2003 | Isohata | |
| 2004/0236462 A1* | 11/2004 | Takeshita et al. | 700/193 |
| 2006/0229760 A1* | 10/2006 | Suzuki et al. | 700/169 |
| 2006/0229761 A1* | 10/2006 | Kita et al. | 700/181 |

FOREIGN PATENT DOCUMENTS

| | | |
|---|---|---|
| CN | 1577194 | 2/2005 |
| JP | 59-177604 | 10/1984 |
| JP | 2003-303005 | 10/2003 |

OTHER PUBLICATIONS

Office Action issued in corresponding Chinese Patent Application No. 2006100749881, on Dec. 7, 2007.

* cited by examiner

*Primary Examiner*—Yonel Beaulieu
(74) *Attorney, Agent, or Firm*—Staas & Halsey LLP (57) ABSTRACT

A numerical controller capable of performing path-table operations in a plurality of systems individually or synchronously, such that during a path-table operation in one system, a path-table operation or an operation according to NC statements can be selectively performed in another system. The plurality of systems are provided with their respective reference variables. It is selected whether the reference variable is set common or specific to each of the plurality of systems. During a path-table operation in one system, it is possible to command a path-table operation in another system to start a path-table operation thereof or to perform waiting of path-table operations in the plurality of systems. If the reference variable is set in common for all systems, path-table operations can be performed synchronously, and if the reference variable is set specific to each of the plurality of systems, path-table operations can be performed individually.

9 Claims, 7 Drawing Sheets

| COMMAND VALUE OF REFERENCE VARIABLE | COMMANDED POSITION | PATH-TABLE OPERATION START COMMAND FOR ANOTHER SYSTEM |
|---|---|---|
| L0 | X0 | |
| L1 | X1 | S23(START SYSTEM #2, #3) |
| L2 | X2 | |
| L3 | X3 | S4(START SYSTEM #4) |

| COMMAND VALUE OF REFERENCE VARIABLE | COMMANDED POSITION | WAITING COMMAND |
|---|---|---|
| La0 | Xa0 | |
| La1 | Xa1 | P12 (WAITING OF SYSTEMS #1 AND #2) |
| La2 | Xa2 | |

| COMMAND VALUE OF REFERENCE VARIABLE | COMMANDED POSITION | WAITING COMMAND |
|---|---|---|
| Lb0 | Xb0 | |
| Lb1 | Xb1 | |
| Lb2 | Xb2 | |
| Lb3 | Xb3 | P12 (WAITING OF SYSTEMS #1 AND #2) |

| COMMAND VALUE OF REFERENCE VARIABLE | COMMANDED POSITION |
|---|---|
| L0 | X0 |
| L1 | X1 |
| L2 | X2 |
| L3 | X3 |
| L4 | X4 |

NUMERICAL CONTROLLER

BACKGROUND OF THE INVENTION

1. Field of the Invention

The present invention relates to a numerical controller for controlling a machine tool, and more specifically to a numerical controller having a function of drive-controlling each axis on the basis of data stored in the form of a table.

2. Description of Related Art

A numerical controller that allows the free movement of a tool without being constrained by commands in blocks as in conventional technology and enables a reduction in machining time and high precision in machining by prestoring the motion amount and position of each axis in the form of a table and drive-controlling each axis according to the data stored in the table, instead of by commands in blocks of an NC program, has been publicly known.

For example, there is a well-known invention that prestores the position of a movable axis by time or by rotation angle as numerical control data, monitors time or rotation angle, and output the numerical control data corresponding to the movable axis every time the stored time or rotation angle is reached (see JP 59-177604A).

In another well-known invention, there is provided a data table for storing the commanded positions of X-axis and Z-axis with respect to reference positions. A value of a counter for counting reference pulses is multiplied by an override value to obtain the reference positions. Based on the reference positions, the commanded positions of the X-axis and Z-axis stored in the data table are outputted to synchronously control the X-axis and the Z-axis. By so doing, even if the drive control is performed by the data stored in the data table, an override can be used. It is also possible to give a command for linear connection between the commanded positions, quadratic-function connection, cubic-function connection or the like, and to give a command for auxiliary functions (see JP 2003-303005A).

Figure 8:
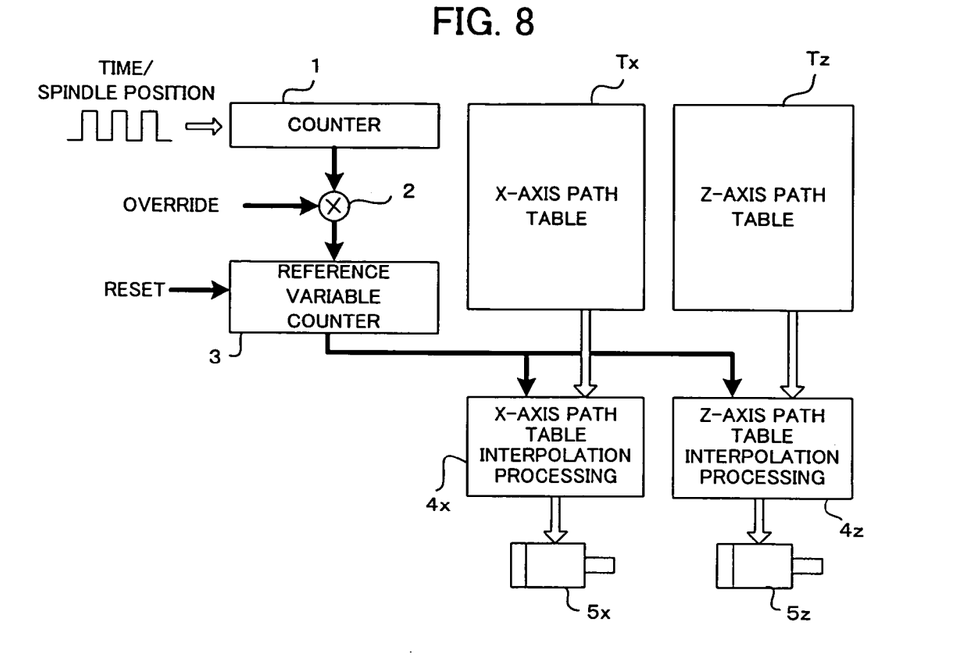
FIG. 8 is a schematic explanatory view of a conventional path-table operation.
Figure 9:
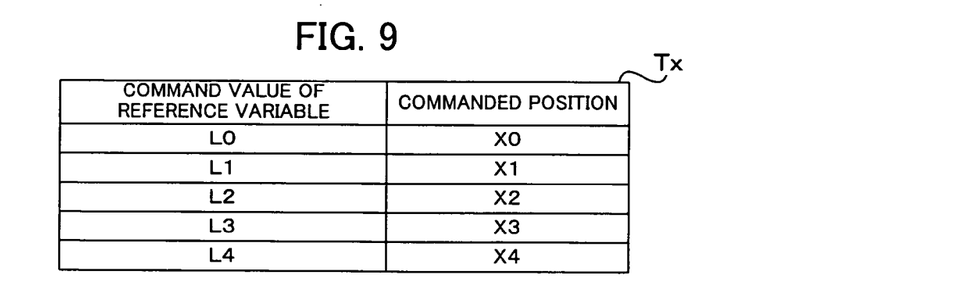
FIG. 9 is an explanatory view of one example of a path table in the same conventional path-table operation.
Figure 10:
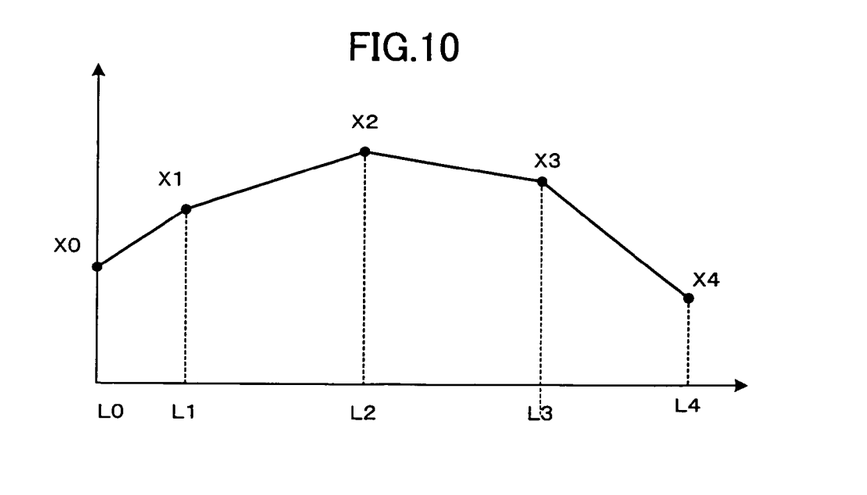
FIG. 10 is an explanatory view of axis movement in the path table shown in FIG. 9.

FIGS. 8 to 10 are schematic views of operations by table data (hereinafter referred to as path-table operation), which is disclosed in JP 2003-303005A and has conventionally been performed.

In the example illustrated in FIG. 8, there are provided an X-axis path table Tx and a Z-axis path table Tz. FIG. 9 shows an example of the X-axis path table Tx, and an X-axis position is stored in relation to a reference variable. FIG. 10 is a graph showing the X-axis position moved according to the X-axis path table Tx shown in FIG. 9.

In the same manner, a Z-axis position is stored in the Z-axis path table Tz in relation to a reference variable. Moreover, a pulse from a position encoder fixed to the spindle (spindle position) or a reference pulse based on time from a reference external pulse generating section is inputted into a counter 1 to be counted. An override value set by override means is multiplied by the counted value of the counter 1 using a multiplier 2 and is stored in a reference variable counter 3. The reference variable counter 3 is reset at the time point when the path-table operation is commanded. Values of the reference variable counter 3 are inputted as reference positions into X-axis and Z-axis path table interpolation processing sections 4x and 4z. The X-axis and Z-axis path table interpolation processing sections 4x and 4z obtain commanded positions of the X-axis and Z-axis with respect to the reference positions, referring to the X-axis path table Tx and the Z-axis path table Tz, and obtain motion amounts in a processing cycle to output the motion amounts to control axis motors 5x and 5z as commands. The X-axis and the Z-axis are then synchronously operated according to the reference positions.

When the path-table operation is carried out by a multi-axis and multi-system lathe or the like, because the reference time or spindle position is common in a conventional numerical controller, the machining by the path-table operation cannot be performed in systems individually. The machining therefore has to be executed after the processing of another system is finished. Additionally, when the path-table operation is performed in a certain system, it is impossible to execute an operation by regular NC statements in another system.

SUMMARY OF THE INVENTION

The present invention provides a numerical controller for controlling a plurality of systems, which enables a path-table operation to be performed in systems individually, the controller in which while a path-table operation is performed in one system, a path-table operation and an NC statement operation are allowed to be performed in another system.

A numerical controller of the present invention controls operations of motors for driving axes of a machine tool, in a plurality of control systems each including one or more of the motors each for driving one of the axes. The numerical controller comprises: first control means for controlling operations of the motors respectively for the plurality of control systems according to NC statements; second control means for controlling operations of the motors respectively for the plurality of control systems according to data tables each storing commanded positions of the axes in each of the plurality of control systems with respect to values of a reference variable; and changeover means for changing over between the controlling of the motors by the first control means and the controlling of the motors by the second control means.

Values of the reference variable updated independently may be used respectively for the data tables for the plurality of control systems.

In this case, the numerical controller may further comprising means for performing waiting of operations of the motors in two or more of the plurality of control systems in controlling operations of the motors according to the data tables.

Values of the reference variable updated commonly may be used for the data tables for the plurality of control systems.

The numerical controller may further comprise means for switching over between a mode in which values of the reference variable updated commonly are used for the data tables for the plurality of control systems and a mode in which values of the reference variable updated independently are used respectively for the data tables for the plurality of control systems.

The numerical controller may further comprise means, in controlling the motors according to the data table in one of the plurality of control systems, for starting controlling of the motors according to the data table in another of the plurality of control systems.

The numerical controller may further comprise means, in controlling of the motors according to the NC statements in one of the plurality of control systems, for starting controlling of the motors according to the data table in another of the plurality of control systems.

The reference variable may be time or a rotational position of a spindle (an axis which rotates in one direction).

In a multi-system numerical controller that controls and operates a plurality of systems, the operation can be performed either by NC statements or by table data. As to a reference of the table data, the operation can be carried out using either a common reference or specific references to the respective systems. It is possible to command the start of an operation by the table data of another system in the middle of the operation performed by NC statements or table data. It is also possible to perform an operation by table data after waiting for two or more systems.

DETAILED DESCRIPTION

Figure 1:
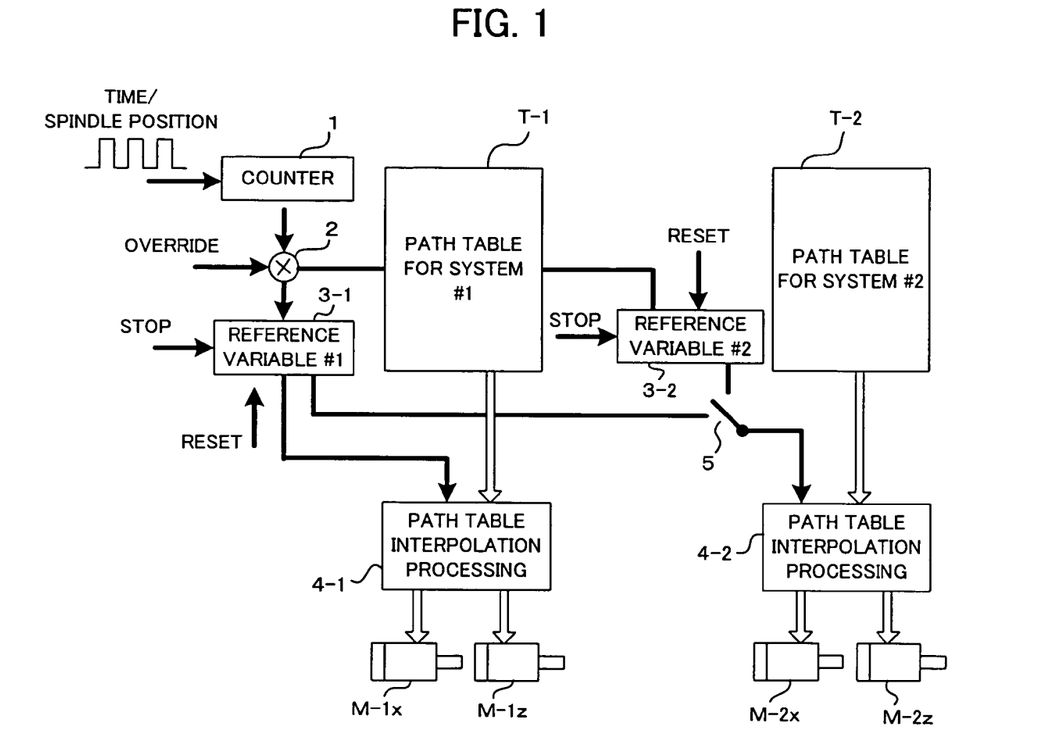
FIG. 1 is a schematic explanatory view of path-table operations of a plurality of systems in one embodiment of the present invention.

FIG. 1 is a schematic explanatory view of path-table operations of a plurality of systems in one embodiment of the present invention. In this embodiment, a conventional path-table operation shown in FIG. 8 is provided to each system. FIG. 1 illustrates an example in which two systems are provided.

The systems #1 and #2 have path tables T-1 and T-2, reference variable counters 3-1 and 3-2, and path table interpolation processing sections 4-1 and 4-2, respectively. There are also provided motors M-1x, M-1z, M-2x, and M-2z for the respective systems.

Pulses from a position encoder fixed to a spindle (spindle position) or reference pulses on the basis of time from a reference external pulse generating section are inputted into a counter 1 to be counted. A counted value of the counter 1 is multiplied by an override value that is set in override means by using a multiplier 2. An output of the multiplier 2 is inputted to each of the reference variable counters 3-1 and 3-2. The reference variable counters 3-1 and 3-2 are individually resettable, and update thereof can be stopped and started again. If the spindle position is used as the reference variable, since a feedback pulse from the position encoder has already generated by providing an override to the rotational frequency of the spindle, the override value multiplied to the value of the counter 1 equals 1. Additionally, command pulses of the spindle may be counted.

In order to enable the path-table operations to be performed synchronously using values of the reference variable commonly among the systems, the reference variable of any one of the systems is set as a common reference variable. Based on this reference variable, the synchronized path-table operations of the systems can be carried out. In this embodiment, an output of the reference variable counter 3-1 of the system #1 can be outputted to the path table interpolation processing section 4-2 of the system #2. In the system #2, there is provided switching means 5 for selecting the common value of the reference variable (output of the reference variable counter 3-1) or selecting the value of the reference variable dedicated for the system #2 (output of the reference variable counter 3-2).

If the common reference variable is selected by the switching means 5, the path table interpolation processing sections 4-1 and 4-2 of the respective systems perform the interpolation processing according to the reference variable that is the output of the reference variable counter 3-1 and the path tables T-1 and T-2 of the respective systems to drive-control the motors M-1x, M-1z, M-2x, and M-2z of the respective systems, to thereby carry out the path-table operation with the systems 1 and 2 synchronized with each other.

If the values of the reference variable to be updated for the respective systems are selected by the switching means 5, the outputs of the reference variable counters 3-1 and 3-2 of the respective systems are inputted to the path table interpolation processing sections 4-1 and 4-2 of the respective systems as values of the reference variable of the respective systems. Since the reference variable counters 3-1 and 3-2 can be individually reset, it is possible to execute the path-table operations completely separately.

Figure 2:
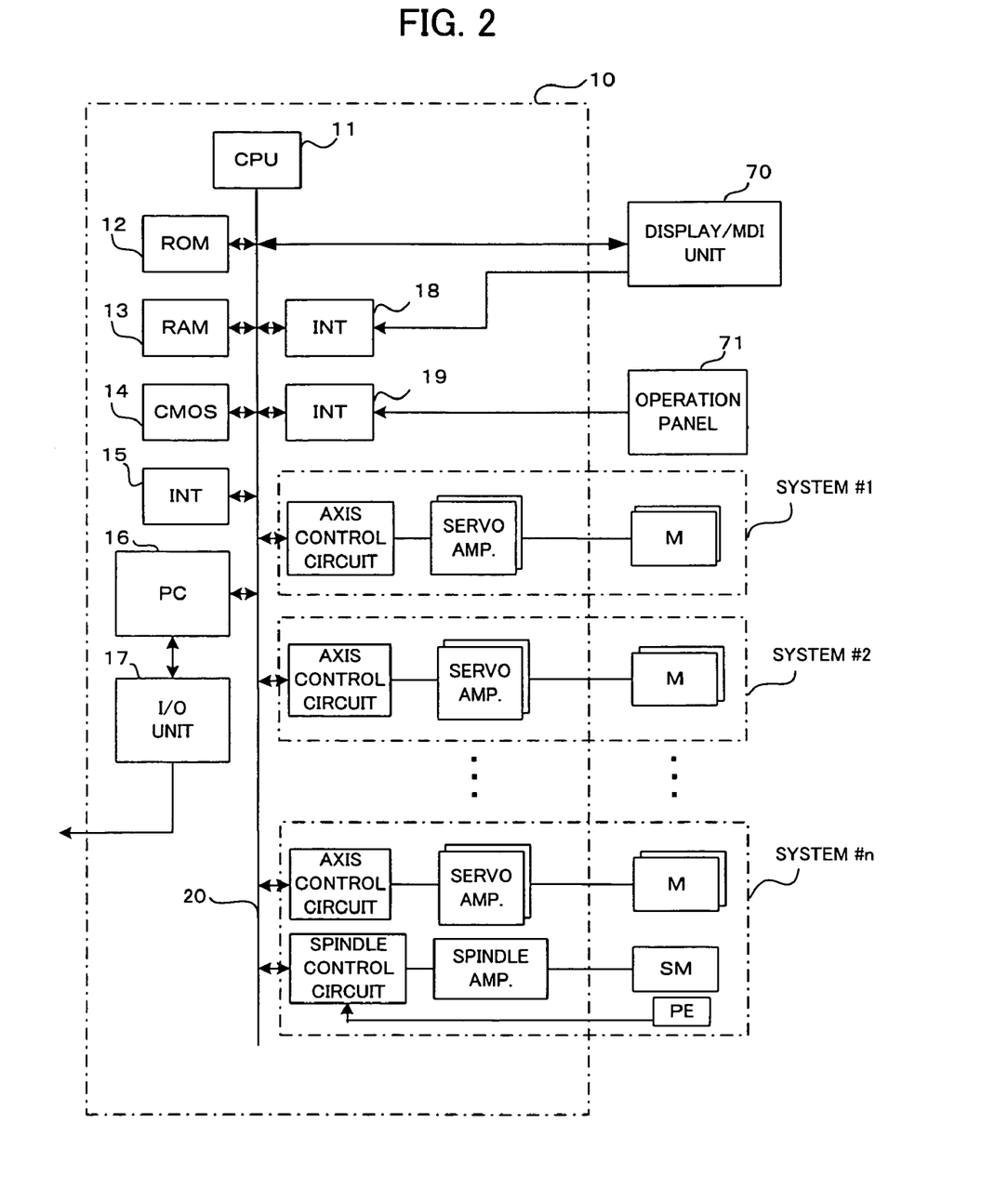
FIG. 2 is a block diagram of a substantial part of a numerical controller of the same embodiment.

FIG. 2 is a block diagram of a substantial part of a numerical controller 10 capable of controlling the multi-systems of the present embodiment and performing the respective path-table operations.

A CPU 11 is a processor that entirely controls the numerical controller 10. The CPU 11 reads out a system program stored in a ROM 12 through a bus 20 and controls the entire numerical controller according to the system program. A RAM 13 stores temporary calculated data, display data, and various kinds of data inputted by the operator through a display/MDI unit 70. A CMOS memory 14 is backed up with a battery, not shown, and is formed as nonvolatile memory in which a storage state is retained even if the numerical controller 10 is switched off. Stored in the CMOS memory 14 are a machining program that is read through an interface 15, a machining program inputted through the display/MDI unit 70, etc. Furthermore, the path tables T-1 and T-2 of the respective systems are prestored.

The interface 15 enables connection between the numerical controller 10 and an external device. A PC (programmable controller) 16 outputs a signal through an I/O unit 17 to an auxiliary device of a machine tool according to a sequence program that is internally stored in the numerical controller 10, thereby carrying out control. The PC 16 also receives signals of various switches of an operation panel provided to a main body of the machine tool, and the like, and transmits the signals to the CPU 11 after performing necessary signal processing.

The display/MDI unit 70 is a manual data input device including a display made up of CRT, liquid crystal or the like, a key board, etc. An interface 18 receives commands and data from the keyboard of the display/MDI unit 70, and transmits the commands and the data to the CPU 11. An interface 19 is connected to an operation panel 71, to thereby receive various commands from the operation panel 71.

An axis control circuit for controlling each of axis motors M for systems 1 to n is connected to the bus 20, and receives a motion command amount of each axis of each system from the CPU 11 to output a command of each axis to a servo amplifier. Upon receipt of the commands, the servo amplifier drives the servomotors M of the respective axes. Each servomotor M of each axis includes a position/velocity detector, feedbacks a position/velocity feedback signal from the position/velocity detector to the axis control circuit, and performs position/velocity feedback control. In FIG. 2, the position/velocity feedback is omitted.

At least one of the systems has a spindle motor SM. A spindle control circuit receives a spindle rotation command from the CPU 11, and carries out spindle motor drive that drives the spindle through a spindle amplifier. The position encoder PE feedbacks feedback pulses (reference pulses) and one-rotation signal to the spindle control circuit in synchronization with the rotation of the spindle, to thereby perform velocity control. The feedback pulses and the one-rotation signal are read by the CPU 11 through the spindle control circuit. The feedback pulses (reference pulses) are counted by the counter (counter 1 in FIG. 1) provided to the RAM 13. It is possible to count command pulses of the spindle.

Figure 3:
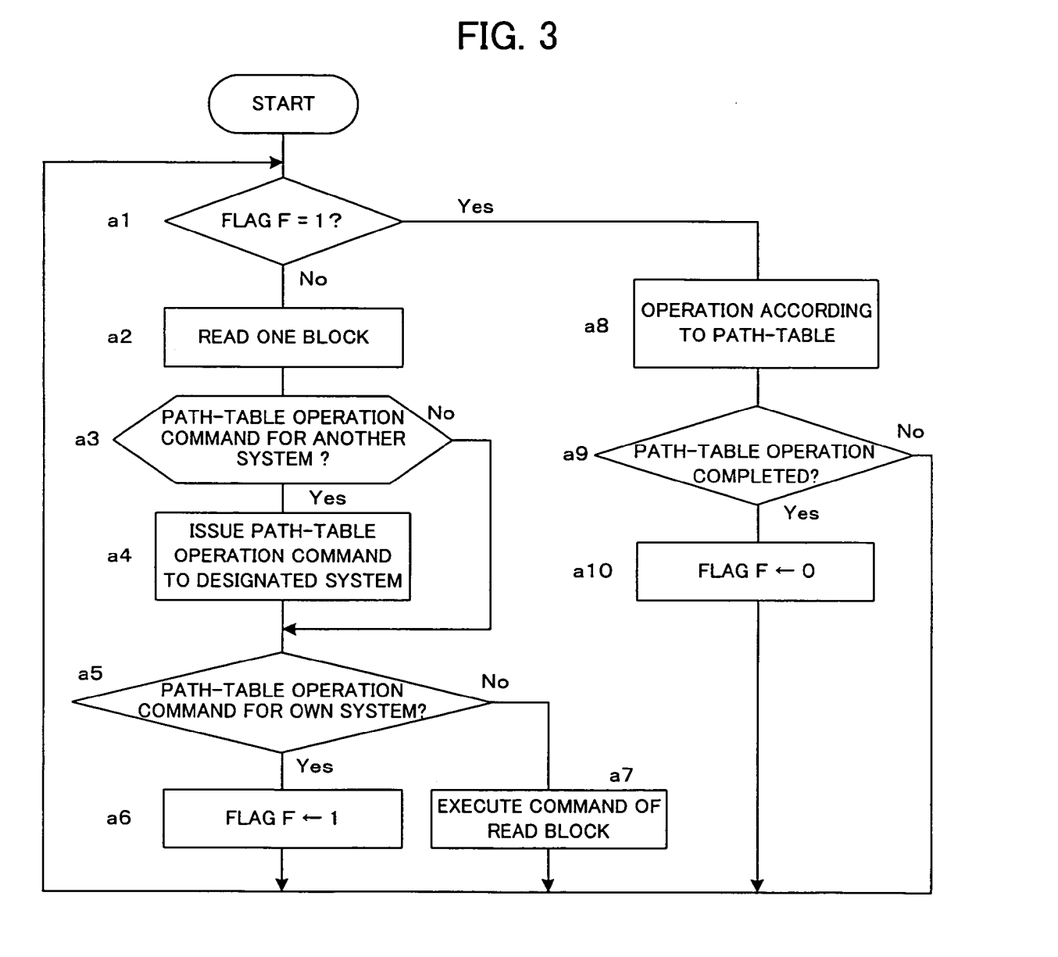
FIG. 3 is a flowchart showing an algorithm for operation processing that is executed every predetermined cycle in each system according to the same embodiment.

FIG. 3 is a flowchart showing an algorithm for operation processing carried out every predetermined cycle for the control systems of the numerical controller.

The CPU 11 determinates whether or not a flag F indicating the path-table operation is set to "1" (Step a1). If the flag F is not set to "1", the CPU 11 reads one block from NC statements (Step a2), and determinates whether or not a command of the read block is a path-table operation command for another control system (Step a3). If the command is the path-table operation command for another control system, the CPU 11 outputs the path-table operation command to the designated control system (Step a4). In the designated control system, the flag F storing the path-table operation is set to "1" by the above-mentioned path-table operation command to start the path-table operation. When Step a3 determines that the command of the read block is not the path-table operation command for another control system, it is determined whether or not the command is a path-table operation command for the control system in process (Step a5). If the command is the path-table operation command for the control system in process, the flag F is set to "1" (Step a6), and the procedure returns to Step 1. If the command is not the path-table operation command for the control system in process, processing commanded by the read block is executed (Step a7).

If it is determined that the flag F is set to "1" in Step a1, an operation according to the preset path table is started (Step a8). This path-table operation will be described later. When the path-table operation is completed (Step a9), the flag F is set to "0" (Step a10), and the procedure returns to Step a1. As a result, processing and operation according to NC statements will be performed from the next processing cycle unless the path-table operation command is read.

Figure 4:
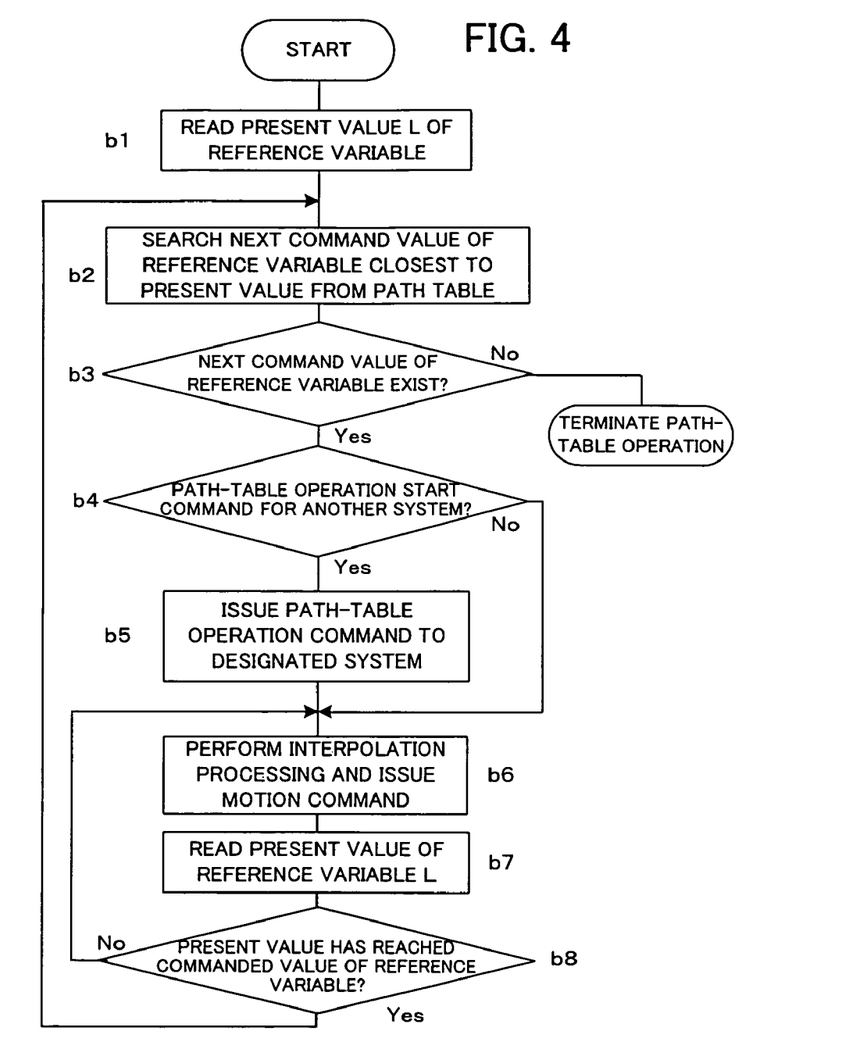
FIG. 4 is a flowchart showing the processing of a path-table operation of an embodiment in which a path table of another system is commanded during a path-table operation.

FIG. 4 is a flowchart of the processing of a path-table operation of an embodiment in which a path table of another system is commanded during the path-table operation. In this case, it is possible, by selecting a mode by the switching means 5, either to perform the path-table operations of a plurality of systems on the basis of the common reference variable or to perform the path-table operations on the basis of the reference variables dedicated to the respective systems. When the path-table operation is started, the value of the reference variable is reset.

Figure 5:
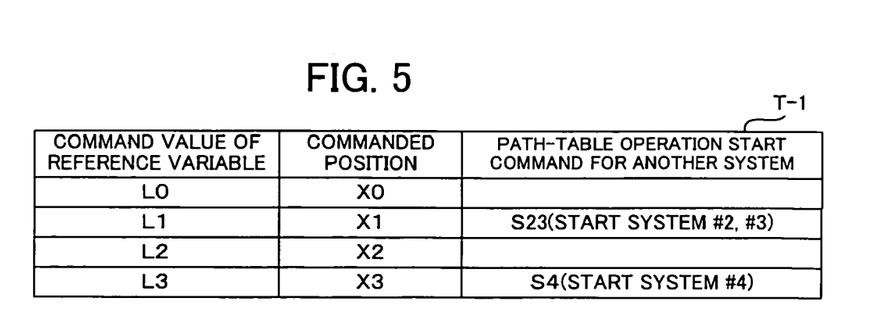
FIG. 5 is an explanatory view of one example of a path table used in the embodiment in which the path table of another system is commanded during a path-table operation.

FIG. 5 shows one example of a path table used in an embodiment where a path table of another system is commanded during the path-table operation. In the system shown in FIG. 5, one example of the path table T-1 with respect to an X-axis is shown, and a similar path table is provided to another axis.

The X-axis position is set and stored for the reference variable, and a start command to another system is also set with respect to the reference variable. In FIG. 5, it is commanded that the X-axis is in a position X0 when the value of the reference variable is L0, and that the X-axis is in a position X1 when value of the reference variable is L1. At the same time, a path-table operation start command is set and stored with respect to systems 2 and 3. It is commanded that the X-axis is in a position X2 when the value of the reference variable is L2, and that the X-axis is in a position X3 when the value of the reference variable is L3. Also, the path-table operation start command is set and stored for a system #4.

When the path-table operation is started, the CPU 11 starts the processing shown in FIG. 4. First, the CPU 11 reads out a present value L of the reference variable that is updated successively (Step b1), and searches a command value of the reference variable which is closest to and greater than the read value L of the reference variable from the path table (Step b2). It is premised that the reference variable continues changing in the direction to be incremented. It is determined whether or not a command value of the reference variable greater than the present value L exists (Step b3). If so, a commanded position that is commanded with respect to the command value of the reference variable is read, and it is determined whether or not the path-table operation start command for another system is set (Step b4). If there is no command value of the reference variable, that means the end of the present path-table operation. However, if there is the next command value of the reference variable, and if the path-table operation start command for another system is designated, the path-table operation start is commanded to the designated system (Step b5). The procedure then advances to Step b6. If the path-table operation start command to another system is not set, the procedure proceeds from Step b4 directly to Step b6. In Step b6, interpolation processing is performed with the commanded axis position set for the command value of the reference variable as a target position at every predetermined cycle from the present value to the command value of the reference variable, (Step b6). Subsequently, the present value of the reference variable is read (Step b7). It is determined whether or not the read present value of the reference variable has reached the command value (Step b8). If not, the processing from Step b6 to Step b8 is carried out at every predetermined period.

In the case of the path table T-1 shown in FIG. 5, the command value L0 of the reference variable is read first, and the position X0 commanded for the command value L0 is also read. Since there is no path-table operation start command for another system, the interpolation processing is performed every predetermined period such that a motion command is outputted to the axis control circuit of the system to drive the motor until the present value of the reference variable reaches the command value L0 so that the axis position reaches the command position X0.

When the present value of the reference variable reaches the command value, the procedure returns to Step b2, and the aforementioned processing is carried out. In the case of the path table T-1 shown in FIG. 5, however, the commanded position X1 with respect to the next command value L1 of the reference variable is read, and a path table operation command S23 to the systems #2 and #3 is also read. Therefore, the path-table operation command to the systems #2 and #3 is outputted in Step b5.

As described above, the path-table operations are sequentially performed. In the path table T-1 shown in FIG. 5, when the value L3 of the reference variable is read, since a path-table operation command S4 to a system 4 is set, the path table start command is outputted to the system 4. As a result, the interpolation processing for moving the X-axis to the position X3 from the present value of the reference variable to the command value L3. Even if the present value of the reference variable reaches the command value L3, and the procedure returns to Step b2 to read out the next command value of the reference variable, this path-table operation is terminated since the next command value is not set in the path table T-1.

The foregoing is the operation processing in which the path-table operation start command to another system can be outputted during the path-table operation according to the path table T-1 shown in FIG. 5. In this case, it is possible either to use a common reference variable among the systems or to use reference variables dedicated for the respective systems. In case that the reference variables dedicated for the respective systems are used, value of the reference variable of the system in process (the reference variable counter 3-2 of the system in process shown in FIG. 1) is reset at the time when the path-table operation command is received, and the path-table operation is started.

Figure 6:
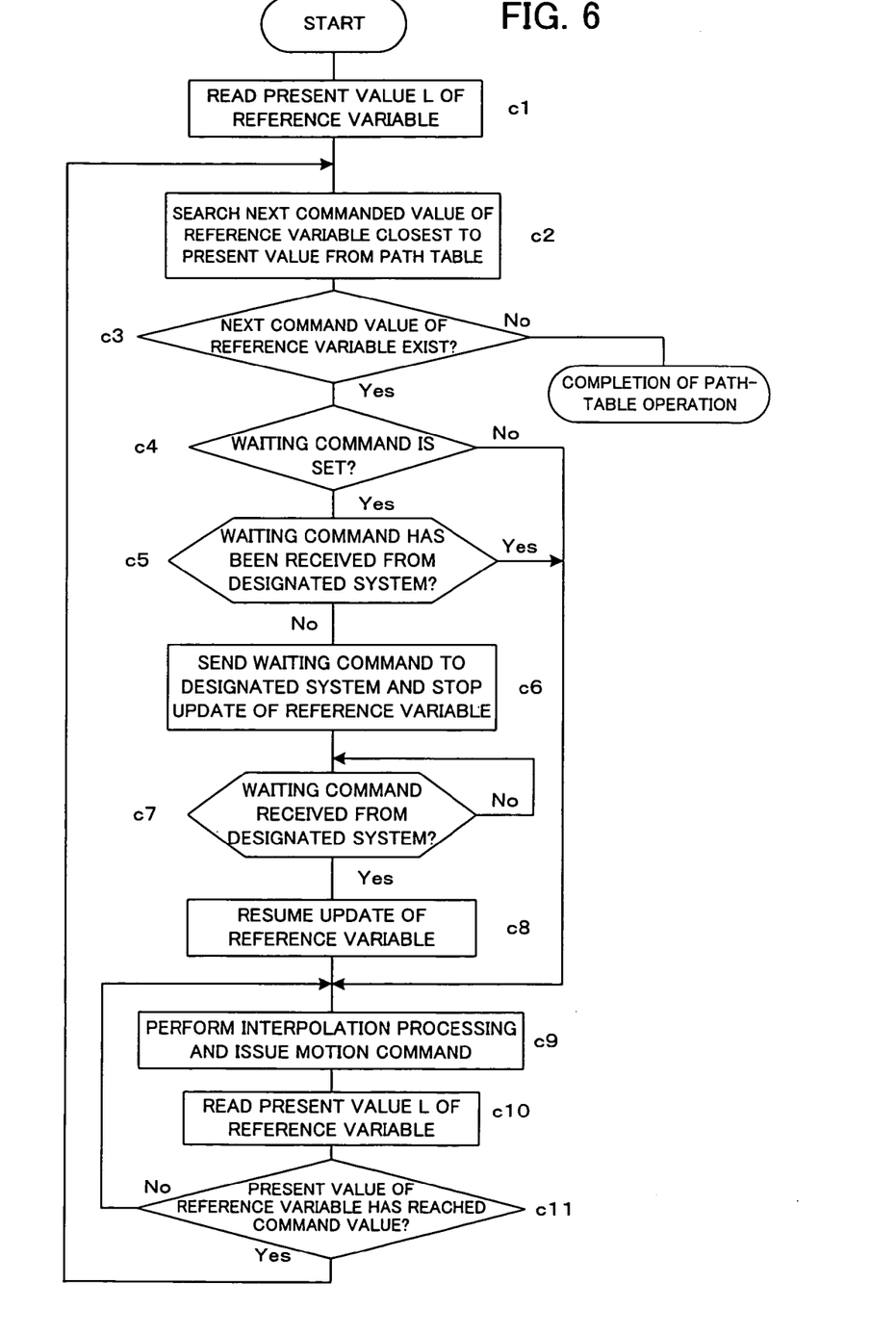
FIG. 6 is a flowchart showing an algorithm for operation processing of an embodiment in which a waiting operation is performed among a plurality of systems during a path-table operation.
Figure 7A:
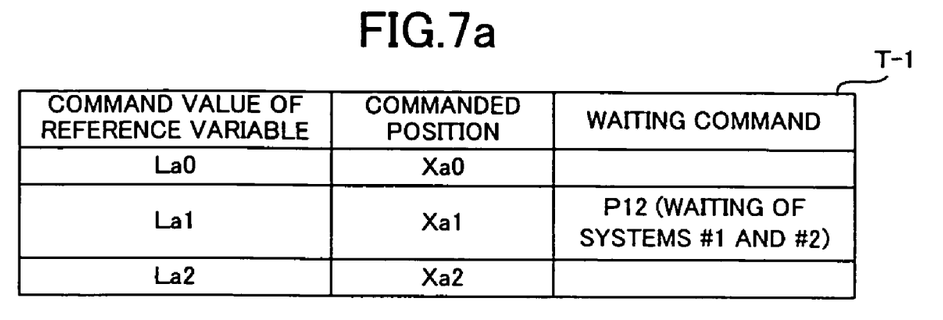
FIGS. 7a and 7b are explanatory views of one example of path tables used in the embodiment where the waiting operation is performed between two systems.
Figure 7B:
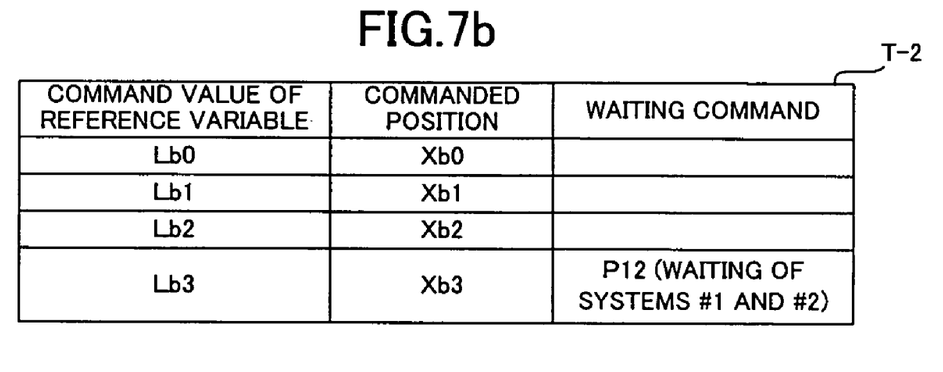

FIGS. 6, 7a and 7b show an embodiment of an example in which a operation is carried out with respect to a plurality of systems during the path-table operation. FIG. 6 is a flowchart showing an algorithm for operation processing in this embodiment. FIGS. 7a and 7b show one example of path tables used in this embodiment. This embodiment takes an example in which the systems 1 and 2 perform the waiting operation. FIG. 7a shows an example of the path table T-1 used in the system #1, whereas FIG. 7b shows an example of the path table T-2 used in the system #2. The path-table operation that performs the system waiting is carried out using the reference variables dedicated for the respective systems.

The CPU 11 reads a present value L of the reference variable updated successively (Step c1), and searches a command value of the reference variable that is close to and greater than the present value L of the reference variable from the path table T-1 (Step c2). It is determined whether or not there exists such command value of the reference variable (Step c3). If so, a commanded position that is commanded with respect to the command value of the reference variable is read, and also it is determined whether or not a waiting command is set for the own system (Step c4). If there is the command value of the reference variable in the path table T-1 and a waiting command is not set, the procedure advances to Step c9, which performs the interpolation processing every predetermined cycle with the axis position commanded with respect to the read command value of the reference variable as a target position (Step c9). The present value of the reference variable is read (Step 10), and it is determined whether or not the read present value of the reference variable has reached the command value (Step c11). If not, the processing from Step c9 to Step c11 is carried out every predetermined cycle. If the present value of the reference variable reaches the read command value, the procedure returns to Step c2, and the above-described processing is performed.

When the system waiting command is set with the read command value of the reference variable, the procedure proceeds from Step c4 to Step c5. It is determined whether or not a wait signal is already received from the designated system. If so, the procedure advances directly to Step c9, and the processing of Step c9 and the subsequent steps is carried out. If the system waiting command has not received from another system, the procedure proceeds from Step c5 to Step c6. A system waiting command is outputted to the designated system, and the update of the reference variable is stopped (Step c6). The procedure waits until the system waiting command is received from the designated system (Step c7). Once the waiting command is inputted from the designated system, the update of the reference variable is resumed (Step c8). The procedure advances to Step c9, and the processing of Step c9 and the subsequent steps is carried out.

Referring to the examples of the path tables T-1 and T-2 shown in FIGS. 7a and 7b, in the system #1, first, a command value La0 of the reference variable and an axis position Xa0 that is set in relation to the command value of the reference variable are read out (Steps c1 and c2), and the system waiting command is not set. Therefore, based on the command value of the reference variable and the commanded axis position, the interpolation processing is carried out. When the next command value La1 of the reference variable and commanded axis position Xa1 are read out, since a system waiting command P12 (waiting command for the systems #1 and #2) is set, it is determined whether or not the a waiting command is received from the system #2. If not, a system waiting command is outputted to the system #2, and the update of the reference variable is stopped and the value thereof is maintained (Steps c4 to c6). In this case, the value of the reference variable is kept to be La1.

Also in the system #2, the operation is performed according to the path table T-2 shown in FIG. 7b. A command value Lb3 of the reference variable is read out, and the system waiting command P12 is set and stored in relation to the command value Lb3 of the reference variable. Therefore, a waiting command is outputted to the system #1. In the system #1, upon receipt of the system waiting command, the procedure advances to Step c11 to resume the update of the reference variable. The procedure proceeds to Step c9, and the interpolation processing is carried out until the value of the reference variable and the axis position reach La1 and Xa1, respectively. A motion command is then outputted to the axis control circuit of the system #1. Also in the system #2, once the system waiting command is received from the system #1, the interpolation processing is carried out until the value of the reference variable and the axis position reach Lb3 and Xb3, respectively. Consequently, the path-table operation is continued.

What is claimed is:

1. A numerical controller for controlling operations of motors for driving axes of a machine tool, in a plurality of control systems each including one or more of the motors each for driving one of the axes, said numerical controller comprising:

first control means for controlling operations of the motors respectively for the plurality of control systems according to NC statements;

second control means for controlling operations of the motors respectively for the plurality of control systems according to data tables each storing commanded positions of the axes in each of the plurality of control systems with respect to values of a reference variable; and changeover means for changing over between the controlling of the motors by said first control means and the controlling of the motors by said second control means.

2. A numerical controller according to claim 1, wherein values of the reference variable updated independently are used respectively for the data tables for the plurality of control systems.

3. A numerical controller according to claim 2, further comprising means for performing waiting of operations of the motors in two or more of the plurality of control systems in controlling operations of the motors according to the data tables.

4. A numerical controller according to claim 1, wherein values of the reference variable updated commonly are used for the data tables for the plurality of control systems.

5. A numerical controller according to claim 1, further comprising means for switching over between a mode in which values of the reference variable updated commonly are used for the data tables for the plurality of control systems and a mode in which values of the reference variable updated independently are used respectively for the data tables for the plurality of control systems.

6. A numerical controller according to claim 1, further comprising means, in controlling the motors according to the data table in one of the plurality of control systems, for starting controlling of the motors according to the data table in another of the plurality of control systems.

7. A numerical controller according to claim 1, further comprising means, in controlling of the motors according to the NC statements in one of the plurality of control systems, for starting controlling of the motors according to the data table in another of the plurality of control systems.

8. A numerical controller according to claim 1, wherein the reference variable is time.

9. A numerical controller according to claim 1, wherein the reference variable is a spindle position.

* * * * *